Jan. 25, 1949. C. S. KELLEY 2,459,883
CONTROL APPARATUS
Filed Oct. 27, 1945

INVENTOR
Cecil S. Kelley
BY
ATTORNEY

Patented Jan. 25, 1949

2,459,883

UNITED STATES PATENT OFFICE 2,459,883

CONTROL APPARATUS

Cecil S. Kelley, Forest Hills, Pa., assignor to The Westinghouse Air Brake Company, Wilmerding, Pa., a corporation of Pennsylvania Application October 27, 1945, Serial No. 625,011

9 Claims. (Cl. 137—144)

This invention relates to control apparatus and more particularly to means controlled or adjustable in accordance with direction of movement of a reversible member.

In reversing a reversible internal combustion engine from operation in one direction to operation in the opposite direction it is necessary to cut-off the supply of fuel to the engine in order to permit the engine to stop from operation in the one direction, and then maintain the fuel cut-off until the engine is started in the opposite direction by the usual starting means at which time fuel can be resupplied to the engine.

The principal object of the present invention is the provision of a directional control or responsive device adapted to be adjusted automatically in accordance with direction of rotation of a rotatable member for, in connection with controlling the fuel supply to a reversible internal combustion engine, preventing such supply, in reversing the engine, until after the engine has become stopped from operation in one direction and immediately permitting supply of fuel to the engine upon starting to turn in the opposite direction.

Other objects and advantages will be apparent from the following more detailed description of the invention.

Figure 1:
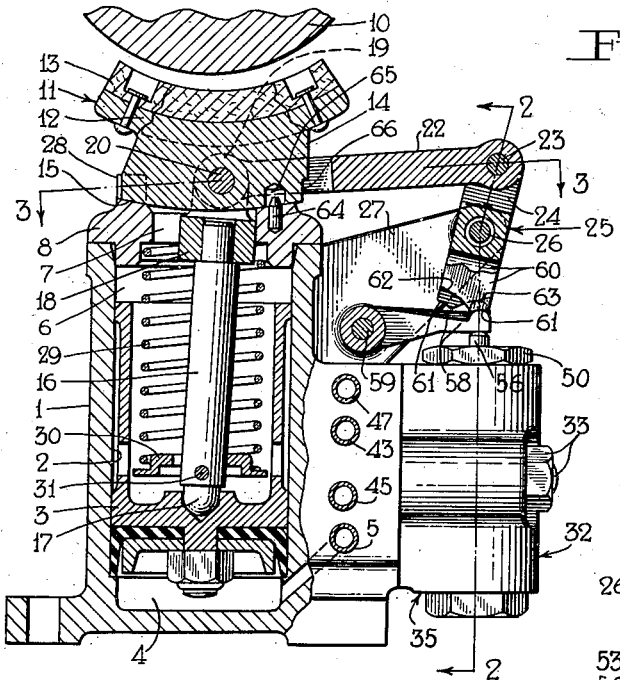
Figure 2:
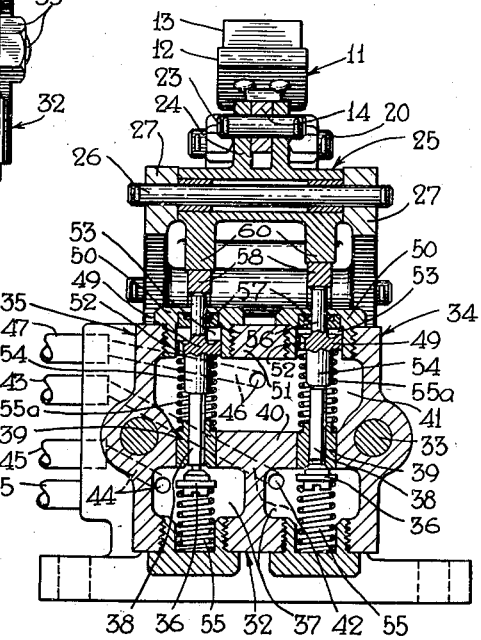
Figure 3:
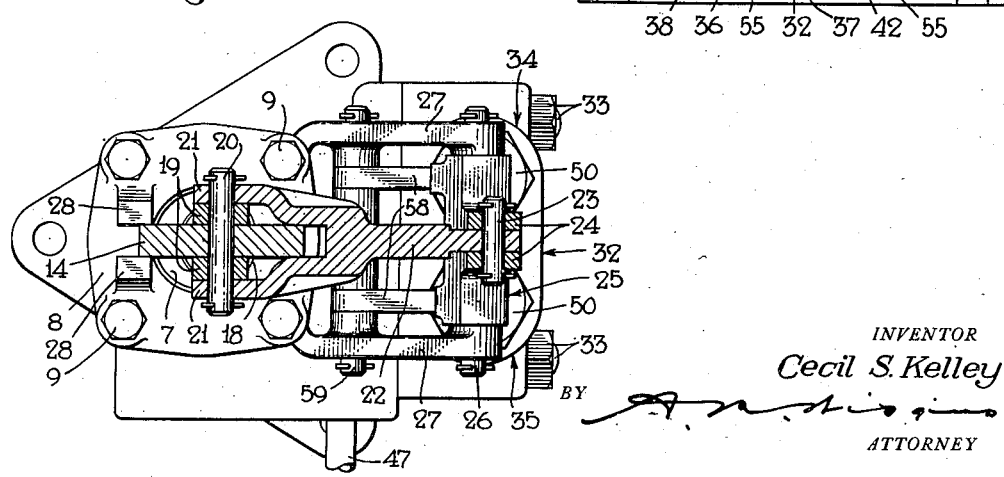

In the accompanying drawings, Fig. 1 is a sectional view of a directional control device embodying the invention, and Figs. 2 and 3 are sectional views of said device taken on the lines 2—2 and 3—3, respectively, on Fig. 1.

Description

As shown in the drawing, the directional control device comprises a casing member 1 having a piston bore 2 in which is slidably mounted a fluid pressure controlled movable abutment preferably in the form of a piston 3. One end of this bore is closed and between pitson 3 and the closed end of bore 2 is a pressure chamber 4 which is open to a control pipe 5. At the opposite side of piston 3 is a non-pressure chamber 6 which is open to atmosphere through an opening 7 provided in a cover 8 which is secured by screws 9 to the casing over the opposite end of bore 2.

Reference numeral 10 indicates a portion of a rotatable shaft such as the crank shaft of a reversible internal combustion engine, and it will be noted that the casing 1 is disposed at one side of said shaft with the bore 2 and piston 3 in radial relation to said shaft and with the end of said bore closed by cover 8 adjacent to said shaft. Reference numeral 11 indicates a friction shoe disposed between the shaft 1 and the cover 8. The shoe 11 may comprise a head 12 and a friction element 13 secured to one side of said head. The friction element 13 is made from any suitable friction material with an outer concave surface for frictionally contacting the peripheral surface of shaft 10. On the opposite side of head 12 is a rib 14 extending in a direction transversely of the shaft and the edge 15 of this rib is convex in form longitudinally of the shoe for engaging a complementary surface provided on the cover 8 at opposite sides of the opening 7 through said cover. When the friction shoe 11 is in engagement with the surface 15 on cover 8 it is adapted to be out of contact with shaft 10.

A piston rod or plunger 16 in the non-pressure chamber 6 has a semispherical end 17 disposed in a socket provided centrally in the adjacent face of piston 3. Secured to the opposite end of rod 16 within opening 7 in cover 8 is a stop member 18 for engaging opposite sides of said opening. The stop member has two spaced apart lugs 19 between which is disposed the friction shoe rib 14, and a pin 20 extending through said lugs and rib connect said shoe to the piston rod 16.

Also connected to pin 20 outside of the lugs 19 are jaws 21 provided on one end of a link 22. The opposite end of link 22 is connected by a pin 23 to arms 24 projecting from a member 25 which is journaled on a shaft 26. The shaft 26 is supported at opposite ends in two arms 27 projecting from the casing member 1.

At the side of friction shoe 11 opposite the member 25, the cover 8 has two spaced apart upstanding ears 28 between which is disposed the shoe rib 14. These ribs and the connections between the shoe 11 and casing member 1 including the link 22 and member 25 serve to maintain said shoe in operative relation to the shaft 10.

A piston release spring 29 encircling the piston rod 16 in the non-pressure chamber 6 bears at one end against the cover 8. The opposite end of spring 29 is supported on a follower 30 slidably mounted on the piston rod and carried by a pin 31 extending through said rod. The spring 16 is confined between cover 8 and the spring seat 30 under pressure for moving the piston 3 and the friction shoe 11 to the positions in which they are shown in the drawing when chamber 4 is void of fluid under pressure.

The member 25 is provided for controlling a valve structure 32 which is removably secured to the casing member 1 by studs and nuts 33. The valve structure 32 comprises two valve devices 34 and 35 of identical structure, each comprising a poppet valve 36 contained in a chamber 37 and having a fluted stem 38 extending through a bushing 39 which is secured in a wall 40 separating chamber 37 from a chamber 41. The chamber 37 in the valve device 34 is open through a passage 42 to a pipe 43, while chamber 37 in the valve device 35 is open through a passage 44 to a pipe 45. Chamber 41 is common to the two valve stems 38, i. e., both stems extend into said chamber which is open through a passage 46 to a pipe 47. It will be apparent that valve 36 in the valve device 34 is arranged to open and close communication between pipes 43 and 47, while valve 36 in the valve device 35 is arranged to open and close communication between pipe 45 and pipe 47. A spring 55 in each chamber 37 acts on the respective valve 36 to urge it to its closed position against a seat on the adjacent end of the respective bushing.

Each of the valve devices 34 and 35 further comprises a plunger 49 slidably mounted in a bore provided in a nut 50 secured in a wall 51 opposite wall 40 of chamber 41. A breather opening 52 through plunger 49 connects chamber 41 to a space 53 at the opposite side of said plunger. The plunger 49 is arranged in coaxial relation with valve 36 and its depending stem 54 for contacting the end of stem 38 projecting from said valve. A coil spring 55a encircling stem 54 and the portion of the respective valve stem 38 extending into chamber 41 is supported at one end on the bushing 39, while the opposite end bears against the plunger 49 for urging said plunger in a direction away from the valve 36.

Each plunger also has an upwardly extending stem 56 extending through a sealing ring 57 and a bore in nut 50 to the exterior of said nut, said ring being provided to prevent leakage of fluid under pressure past said stem from chamber 41.

The coaxially aligned valve 36, plunger 49 and the respective stems 38, 54 and 56 in the valve device 34 are arranged parallel to and are spaced from the corresponding parts of the valve device 35 as will be evident from the drawing, and each of the two plunger stems 56 engages a follower 58 on one side adjacent one end. The opposite ends of the two followers 58 are journaled on a pin 59 extending through and carried by the two arms 27.

The member 25 is provided with two cams 60 which are spaced apart for engagement with followers 58 on the side opposite that engaged by the plunger stems 56. The two cams are identical except formed reversely, each having a portion 61 which when in contact with the respective follower 58 is adapted to open the respective valve 36. Each cam 60 also has a portion 62 which is adapted to contact the respective follower 58 to permit movement of the connected plunger 49 by spring 55a to such a position as to permit closing of the respective valve 36 by its spring 55. The two portions 61 and 62 on each cam 60 are connected together by a portion 63.

The portion 61 of each cam is slightly concave to receive the engaging and rounded end of the respective follower 58 under pressure of the respective spring 55a for locking the parts of the respective valve device 34 or 35 in an adjusted position. To further ensure against movement of the parts out of an adjusted position the cover member 8 is provided below the shoe rib 14 with an upwardly extending pointed pin 64 and said rib has a recess 65 for receiving said pin in the position of the parts in which they are shown in the drawing for preventing longitudinal change in position of the shoe 11 and cams 60. With the shoe 11 in a position defined by contact between stop 18 and the left-hand side of opening 7 and in contact with cover 8, the pin 64 will be disposed in a recess 65 at the right-hand end of the shoe rib 14 for holding the shoe and cams against change in position. The pin 64 is of such length as to be disengaged from the shoe rib 14 when the shoe is in contact with shaft 10.

*Operation*

Let it be assumed that the parts of the directional control device are in the position in which they are shown in the drawing in which position the valve 36 in the valve device 34 is closed and valve 36 in the valve device 35 is open. Let it further be assumed that fluid under pressure is supplied to pipe 5 and thence to piston chamber 4. When the pressure of fluid in chamber 4 is thus increased on piston 3 sufficiently to overcome the opposing force of spring 29, said piston will move against said spring and actuate the piston rod 16 to move the friction shoe 11 against the shaft 10, this movement disconnecting said shoe from pin 64.

If at this time the shaft 10 is turning in a counterclockwise direction it will act through the shoe to merely maintain the stop 18, link 22 and the two valves 36 in the position in which they are shown in the drawing. However if the shaft 10 is stopped and started turning in the opposite or clockwise direction, the friction shoe will move with said shaft the instant it starts to turn in said opposite direction from the position in which it is shown in the drawing to a position defined by contact between stop 18 and the left-hand side of the opening 7 in cover 8. The change in position of shoe 11 will actuate link 22, member 25 and cams 60 to open the valve 36 in the valve device 34 and to permit closure of valve 36 in the valve device 35. If the fluid pressure is then released from chamber 4, spring 29 will return the piston 3 to the position in which it is shown in the drawing and will also move the shoe 11 back into contact with cover 8, the pin 64 being disposed in recess 65 at the right-hand end of the shoe rib 14 at this time to hold said shoe against movement out of its adjusted position.

If fluid under pressure is supplied to chamber 4 to move shoe 11 against shaft 10 and said shaft is turned in a counterclockwise direction, said shoe will instantly respond to such turning to actuate cams 60 to open valve 36 in the valve device 35 and to close valve 36 in the valve device 34, while upon subsequent release of fluid under pressure from chamber 4, the shoe 11 will be moved out of contact with said shaft in the position in which recess 65 is aligned to receive pin 64, as will be evident without further description.

It will now be evident that I have provided a relative simple device which will positively and promptly detect and operate upon a change in direction of rotation of a shaft or the like for selectively controlling the positioning or operation of any desired device such as the two valves 36, and positive yet simple means are provided to ensure that the parts of the device will remain in an adjusted position until a change in position is desired.

In the copending application of Roy R. Stevens, Serial No. 602,255, filed June 29, 1945, relating to control apparatus for Diesel engines there is fully disclosed and broadly covered, a directional control device, substantially like that in the present application, and its association with starting and fuel control devices for said engine. The present invention is limited to the novel structure of the directional control device, above described.

While only one embodiment of the invention has been disclosed it is not my intention to limit its scope to that embodiment or otherwise than by the terms of the appended claims.

Having now described my invention, what I claim as new and desire to secure by Letters Patent is:

1. In combination, a motion reversible member, structure movable by engagement with said member in either of two directions, stop means cooperable with said structure to limit movement thereof in said two directions for defining two different positions of said structure, fluid pressure means for actuating said structure into engagement with said member, means for disengaging said structure from said member, holding means cooperable with said structure in each of said positions upon disengagement from said member to hold said structure against movement out of the respective position in either of said directions and rendered ineffective upon movement of said structure into engagement with said member, and means operable by said structure.

2. In combination, a motion reversible member, a longitudinally and transversely movable structure, means for actuating said structure longitudinally into and out of engagement with said member, means to be controlled operable by transverse movement of said structure by said reversible member in either of two directions, stop means engageable by said structure to limit said transverse movement in both directions for defining two different positions of said structure, and means for holding said structure against transverse movement when disengaged from said reversible member and rendered ineffective by longitudinal movement of said structure into engagement with said member.

3. In combination, a motion reversible member, a longitudinally and transversely movable structure, means operable by transverse movement of said structure in either of two directions to two different positions, stop means for limiting transverse movement of said structure to a zone extending between and including said positions, fluid pressure actuated means for moving said structure longitudinally into engagement with said reversible member for movement transversely by said reversible member, means for moving said structure longitudinally out of engagement with said reversible member, and a pin cooperable with said structure when disengaged from said reversible member to hold said structure against movement out of each of said positions and being ineffective with said structure in engagement with said reversible member.

4. In combination, a motion reversible shaft, a longitudinally and transversely movable structure including friction means for engaging said shaft upon longitudinal movement of said structure, means adjustable to either one of two positions by transverse movement of said structure by said shaft upon rotation of said shaft in either one direction or in the opposite direction, stop means cooperable with said structure in said positions to define said positions and limit transverse movement of said structure to a zone extending between and including said positions, means for holding said structure in each of said positions upon disengagement of said friction means from said shaft, and means for moving said structure longitudinally into and out of engagement with said shaft.

5. In combination, a motion reversible member, a friction shoe movable by said member in a direction corresponding to direction of movement of said member, stop means arranged to limit movement of said shoe in both directions to thereby define two different positions of said shoe, means to be controlled operable by said shoe, means for actuating said shoe into and out of engagement with said member, a fixed pin, said shoe including means cooperating with said pin in both of said positions when said shoe is disengaged from said member to hold said shoe against movement out of the respective position and being rendered ineffective by movement of said shoe into engagement with said member.

6. In combination, a reversible rotatable shaft, a casing having a piston bore arranged radially to said shaft, a friction shoe for engaging said shaft adapted to be supported by said casing over one end of said bore, a plunger in said bore connected to said shoe, piston means in said bore operable by fluid under pressure to actuate said plunger longitudinally to move said shoe against said shaft, said shoe being movable by said shaft to either one of two positions corresponding to the direction of rotation of said shaft, stop means in said casing for limiting movement of said shoe by said shaft to a zone extending between and including said two positions, means in said casing for moving said shoe out of contact with said shaft and into supporting engagement with said casing, means for holding said shoe against movement out of either one of its positions upon engagement with said casing and rendered ineffective upon engagement of said shoe with said shaft, and means to be controlled adjustable by movement of said shoe by said shaft.

7. In combination, a reversible rotatable shaft, a casing having a piston bore arranged radially to said shaft, a friction shoe for engaging said shaft adapted to be supported by said casing over one end of said bore, a plunger in said bore connected to said shoe, piston means in said bore operable by fluid under pressure to actuate said plunger longitudinally to move said shoe against said shaft, said shoe being movable by said shaft to either one of two positions corresponding to the direction of rotation of said shaft, stop means in said casing for limiting movement of said shoe by said shaft to a zone extending between and including said two positions, means in said casing for moving said shoe out of contact with said shaft and into supporting engagement with said casing, a pin in said casing, a recess in said shoe arranged to receive said pin in one of said positions of said shoe to hold said shoe against movement out of the last named position and said shoe being free of said pin upon engagement with said shaft, and means to be controlled connected for movement with said shoe by said shaft.

8. In combination, a reversible rotatable shaft, a casing, two position valve means in said casing, two position movable cam means associated with said casing for adjusting said valve means and comprising means cooperable with said valve means in each of its positions to oppose movement of said cam means out of the respective position, a bore in said casing arranged radially to said shaft, longitudinally and transversely movable plunger means in said bore, a friction element connected to and movable with said plunger means and operable by longitudinal movement of said plunger means into and out of engagement with said shaft, means operable by transverse movement of said plunger means and friction means in either one direction or in the opposite direction by said shaft upon rotation of said shaft in either direction to move said cam means to a position corresponding to the direction of rotation of said shaft, and means for actuating said plunger means longitudinally to move said friction means into and out of contact with said shaft.

9. In combination, a reversible rotatable shaft, a casing, two position valve means in said casing, two position movable cam means associated with said casing for adjusting said valve means and comprising means cooperable with said valve means in each of its positions to oppose movement of said cam means out of the respective position, a bore in said casing arranged radially to said shaft, longitudinally and transversely movable, plunger means in said bore, a friction element connected to and movable with said plunger means and operable by longitudinal movement of said plunger means into and out of engagement with said shaft, means operable by transverse movement of said plunger means and friction means in either one direction or in the opposite direction by said shaft upon rotation of said shaft in either direction to move said cam means to a position corresponding to the direction of rotation of said shaft, means for actuating said plunger means longitudinally to move said friction means into and out of contact with said shaft, and holding means associated with said casing and cooperative with said friction means upon disengagement from said shaft to prevent transverse movement of said plunger means and rendered ineffective upon longitudinal movement of said plunger means to move said friction means into contact with said shaft.

CECIL S. KELLEY.

REFERENCES CITED

The following references are of record in the file of this patent:

UNITED STATES PATENTS

| Number | Name | Date |
|---|---|---|
| 978,579 | Grebel | Dec. 13, 1910 |
| 1,075,357 | Kirkley | Oct. 14, 1913 |